United States Patent
Stageberg (10) Patent No.: US 9,540,065 B2
(45) Date of Patent: Jan. 10, 2017

(54) MOTORIZED VEHICLE MOUNTING DEVICE

(71) Applicant: Kevin Stageberg, Lakeland, FL (US)

(72) Inventor: Kevin Stageberg, Lakeland, FL (US)

( * ) Notice: Subject to any disclaimer, the term of this patent is extended or adjusted under 35 U.S.C. 154(b) by 44 days.

(21) Appl. No.: 14/602,913

(22) Filed: Jan. 22, 2015

(65) Prior Publication Data
US 2016/0214670 A1    Jul. 28, 2016

(51) Int. Cl.
*B62J 11/00* (2006.01)
*B60R 7/04* (2006.01)

(52) U.S. Cl.
CPC .. *B62J 11/00* (2013.01); *B60R 7/04* (2013.01)

(58) Field of Classification Search
CPC ..... B62J 11/00; B60R 7/04; B60R 2011/0026; B60N 3/007
USPC .................................. 224/482, 483
See application file for complete search history.

(56) References Cited

U.S. PATENT DOCUMENTS

| | | | | |
|---|---|---|---|---|
| 5,086,958 A | * | 2/1992 | Nagy | B60N 3/002 224/277 |
| 5,187,744 A | * | 2/1993 | Richter | B60R 11/0241 224/553 |
| 5,396,556 A | * | 3/1995 | Chen | B60R 11/0241 379/426 |
| 5,568,549 A | * | 10/1996 | Wang | B60R 11/0241 379/426 |
| 5,779,205 A | * | 7/1998 | Ching | B60R 11/0241 248/205.8 |
| 5,979,724 A | * | 11/1999 | Loewenthal, Jr. | B60R 11/0241 224/483 |
| 6,062,518 A | * | 5/2000 | Etue | B60R 11/0241 224/542 |
| 6,085,113 A | * | 7/2000 | Fan | B60R 11/0241 379/426 |
| 6,158,793 A | * | 12/2000 | Castro | B60R 11/02 224/548 |
| 6,427,959 B1 | * | 8/2002 | Kalis | H04M 1/04 248/288.11 |
| 6,779,765 B2 | * | 8/2004 | Zheng | B60R 11/02 248/206.3 |
| 7,292,881 B2 | * | 11/2007 | Seil | H04B 1/3822 455/575.1 |
| 7,475,858 B2 | * | 1/2009 | Kalis | B60R 11/0258 248/205.5 |
| 8,215,596 B2 | * | 7/2012 | Duan | F16M 11/10 16/337 |
| 8,276,863 B2 | * | 10/2012 | Niwai | B60R 11/0241 224/483 |
| 8,727,192 B2 | * | 5/2014 | Lai | B60R 11/0241 224/282 |

(Continued)

*Primary Examiner* — Brian D Nash
(74) *Attorney, Agent, or Firm* — K&L Gates LLP (57) ABSTRACT

Apparatuses and methods for mounting a motor vehicle accessory on a motorcycle are described herein. In an embodiment, a mounting device for a motorized vehicle comprising a first member positionable against a first surface of a fixture of the vehicle, a second member positionable against a second surface of the vehicle fixture, the first member pivotally attachable along a first interface to the second member and configured to be fixed at a second interface with the second member so that the first and second members clamp to the vehicle fixture, and a mount positioned on one of the first or second members for receiving a motorized vehicle accessory.

12 Claims, 6 Drawing Sheets

(56) References Cited

U.S. PATENT DOCUMENTS

| | | | | |
|---|---|---|---|---|
| 2006/0215836 A1* | 9/2006 | Wang | ............... | H04M 1/04 |
| | | | | 379/455 |
| 2011/0006091 A1* | 1/2011 | Schafer | ............ | B60R 11/00 |
| | | | | 224/282 |
| 2012/0199621 A1* | 8/2012 | Yoon | ............... | B60R 11/02 |
| | | | | 224/483 |
| 2012/0205412 A1* | 8/2012 | Choi | ............... | B60R 11/02 |
| | | | | 224/483 |

* cited by examiner

MOTORIZED VEHICLE MOUNTING DEVICE

FIELD OF THE INVENTION

The present disclosure generally relates to apparatuses and methods for mounting a motor vehicle accessory on a motor vehicle, and more specifically to apparatuses and methods for mounting a motor vehicle accessory near a motorcycle windshield for easy access by a motorcycle rider while driving the motorcycle.

BACKGROUND

Automobile accessories such as Global Positioning System ("GPS") devices have become increasingly popular for drivers of automobiles due to the convenient navigation directions that they provide to a driver. Such GPS devices are most easily used when positioned so that the driver can quickly glance at the GPS screen. It can be dangerous for the driver to look away from the road if the GPS device is not conveniently located.

Automobile GPS attachment devices are not suitable for motorcycles. GPS devices can be attached to automobile windshields using one or more suction cup. This placement allows a driver to quickly glance at the GPS screen while driving without looking away from the road. Suction cups, however, cannot be used with motorcycles because the vibration of the motorcycle overcomes the suction ability of the cups. Another automobile GPS attachment device is a weighted device, such as a sandbag, that weights the GPS device to a desired spot on the driver's dashboard. Weighted GPS devices will not work with motorcycles again due to their vibration, and to the turning and leaning of the motorcycles.

Due to the limitations of automobile GPS attachment devices, motorcycles have accordingly mounted GPS devices on the motorcycle's handlebars, which provide a solid base for attachment of the GPS device. This placement, however, requires the driver to look downward at the handlebars while driving to view the GPS device, which can be dangerous. This placement also causes the GPS device to move when the handlebars are turned, further impairing the viewing of the GPS device. A need therefore exists for an improved GPS attachment device for motorcycles.

SUMMARY

The present disclosure provides a mounting device that can position a GPS device or other motorized vehicle accessory, so that the rider of the motorized vehicle can view the device easily while driving the motorcycle, without obstructing the rider's view of the road. The GPS attachment device and method are described herein as being attached to a windshield. While the windshield can be that of a motorcycle, it is contemplated that the windshield can be for any type of motorized vehicle, including motorcycles, scooters, mopeds, snowmobiles, boats, and the like. Also, while a GPS device is a preferred motor vehicle accessory for use with the mounting apparatus of the present disclosure, the apparatus could be a different structure, such as a cup holder, a radar detector, a camera, a cell phone, a compass, a clock and/or a speedometer.

The GPS mounting device described herein can, for example, be attached to a vent cover positioned on a motorcycle windshield. The GPS mounting device does not require that any additional holes be drilled into the windshield in one embodiment, but instead takes advantage of the vent cover already provided at the windshield. The GPS mounting device is secured to the vent cover in one embodiment using pivotally attachable first and second members, which are positioned around and clamped onto one of the horizontal surfaces of the vent cover. A motorcycle accessory can then be attached to the mount and viewed by the rider with a slight glance downward. In an embodiment, a separate accessory mount for the accessory is provided, which is mounted to the GPS mounting device of the present disclosure. The accessory is then mounted to the accessory mount.

The mounting device described herein also advantageously reduces vibrations and the bouncing of the GPS device while the motorcycle is being ridden. In an embodiment, the mounting device includes a stabilization mechanism that applies pressure against the windshield and the mounting device, tending to push the mounting device away from the windshield. The stabilization mechanism causes the mounting device to press against the vent cover in one embodiment to reduce vibrations and bouncing.

It is therefore an advantage of the present disclosure to provide an apparatus and method for mounting a GPS device to a motorized vehicle, so that the GPS device is easily viewable.

It is another advantage of the present disclosure to provide an apparatus and method for mounting a GPS device to a motorized vehicle, so that the GPS device is easy to install and requires no holes to be formed in the motorized vehicle.

It is a further advantage of the present disclosure to provide an apparatus and method for mounting a GPS device to a motorized vehicle, so that the GPS device is readily removeable.

It is yet another advantage of the present disclosure to provide an apparatus and method for mounting a GPS device that is relatively inexpensive, yet durable.

Other features and advantages of the invention will be apparent from the following specification taken in conjunction with the following drawings.

DETAILED DESCRIPTION

Figure 1:
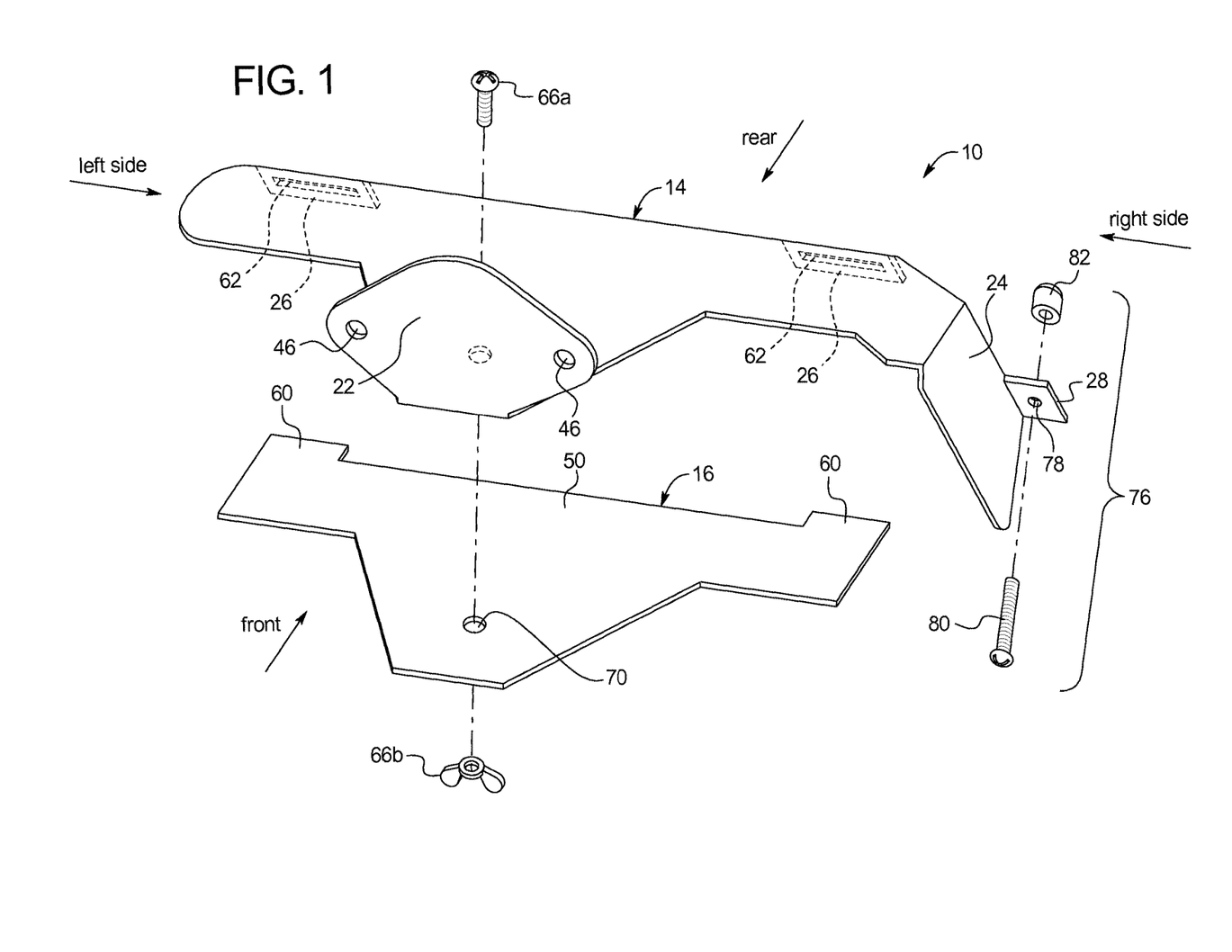
FIG. 1 is a top, perspective view of one embodiment of a mounting device of the present disclosure.

Referring now to FIGS. 1 to 7, FIG. 1 shows an example embodiment of a motorized vehicle mounting device 10 according to the present disclosure. In the embodiment of FIG. 1, mounting device 10 includes a first member 14 removeably connected to a second member 16. As explained in more detail below, second member 16 can be pivotally attached to first member 14, so as to clamp device 10 to a vent cover or other projection located adjacent to a windshield of the motorized vehicle. The clamping as discussed below is performed in such a way that additional mounting holes do not need to be formed in the vent cover or elsewhere in the motorized vehicle.

FIG. 1 shows mounting device 10 in the orientation in which it will be installed. The terms top, bottom, front, rear, left side, right side, up and down will be used consistently below and as they have been designated via arrows in FIG. 1.

Figure 6:
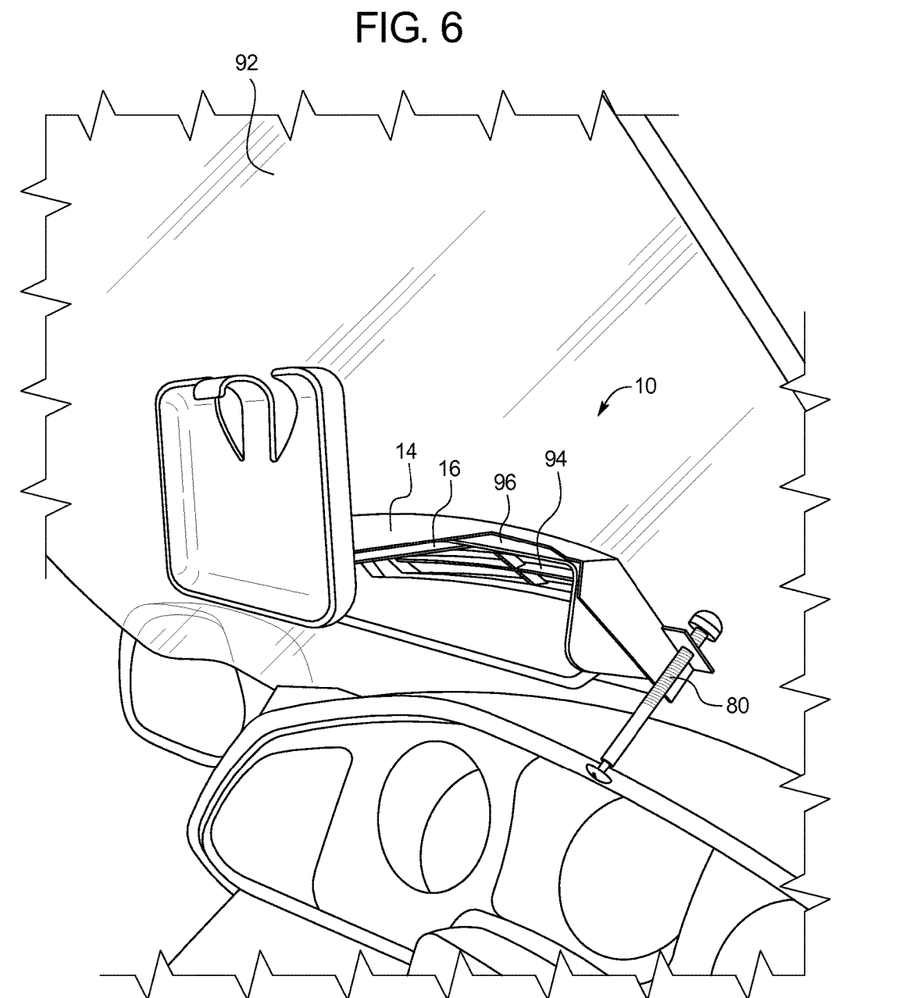
FIGS. 6 and 7 are perspective views illustrating one embodiment for mounting a GPS device of the present disclosure to a motorized vehicle windshield.
Figure 7:
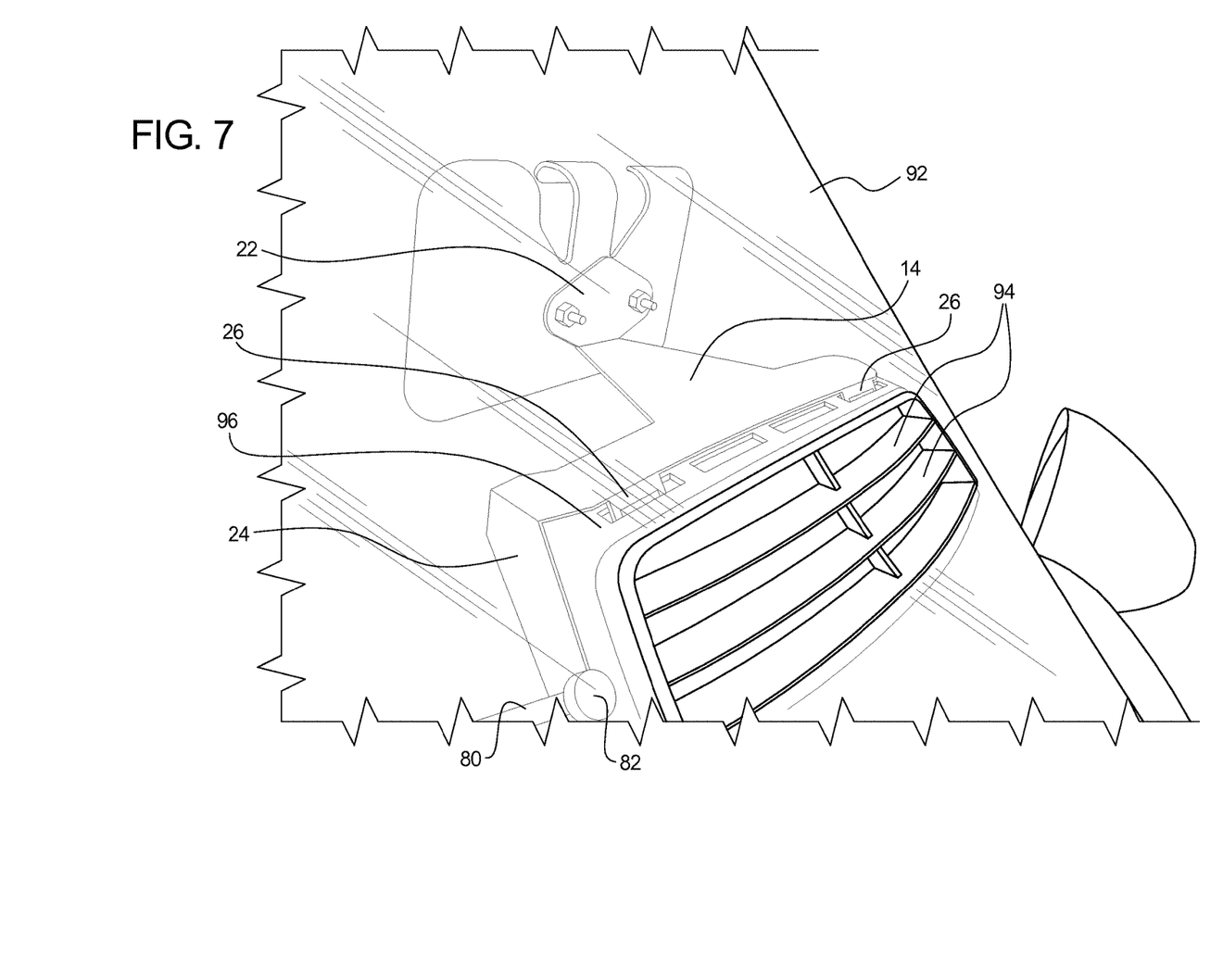

Viewing FIGS. 1 and 7, mounting device 10 mounts to the motorized vehicle by clamping to a horizontal, or substantially horizontal, vent rung or member 96 of a vent cover 90 (FIG. 6) of the motorized vehicle. First member 14 sits on top of the top surface 96 of vent cover 90. Projections 26 of first member 14 extend down into the top surface 96 of vent cover 90.

Second member 16 slides in beneath the top surface 96 of vent cover 90, so that tabs 60 of the second member 16 fit into slots 62 of projections 26 of first member 14. The fit of tabs 60 into slots 62 is loose so that second member 16 can rotate slightly relative to first member 14 and the horizontal top surface 96 of vent cover 90. The user can thereby clamp first member 14 and second member 16 together at their front ends so that aperture 68 (FIG. 2) of first member 14 comes together with aperture 70 of second member 16. The user can then clamp mounting device 10 to the vehicle by inserting fastener 66a through aligned holes 68 and 70 and securing a nut 66b to the fastener. Fastener 66a can alternatively be formed with or attached to either first member 14 or second member 16 to further simplify the mounting of mounting device 10 to the vehicle.

The user then adjusts a stabilizing screw 80 within a threaded hole 78 of first member 14, so that a soft tip 82 located on the distal end of screw 80 abuts windshield 92 (FIGS. 6 and 7) on its inside surface. Screw 80 applies pressure to mounting device 10, reducing vibration and movement, so that mounting device 10 tends not to work its way loose, and so that the accessory remains stable for viewing.

Figure 2:
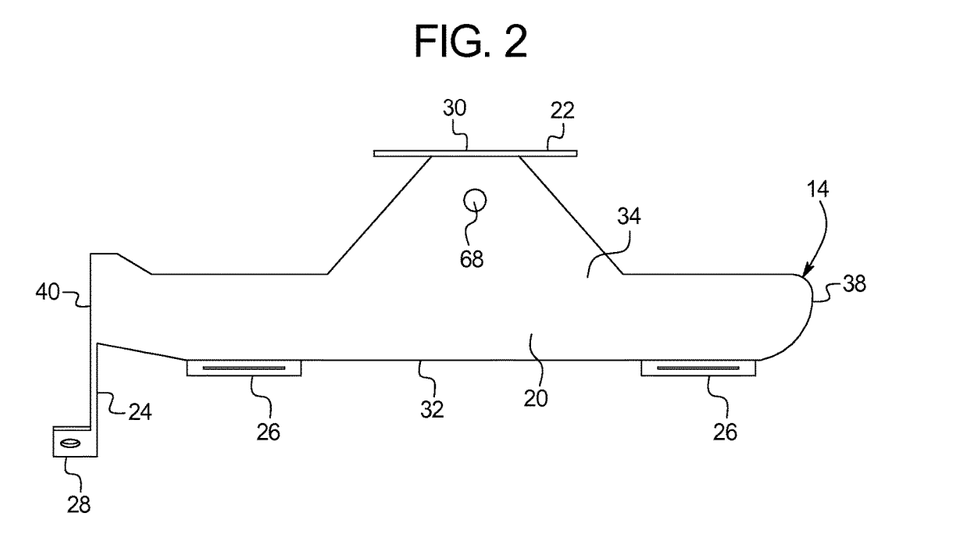
FIG. 2 is a top view of one embodiment of a member of the mounting device illustrated in FIG. 1.
Figure 3:
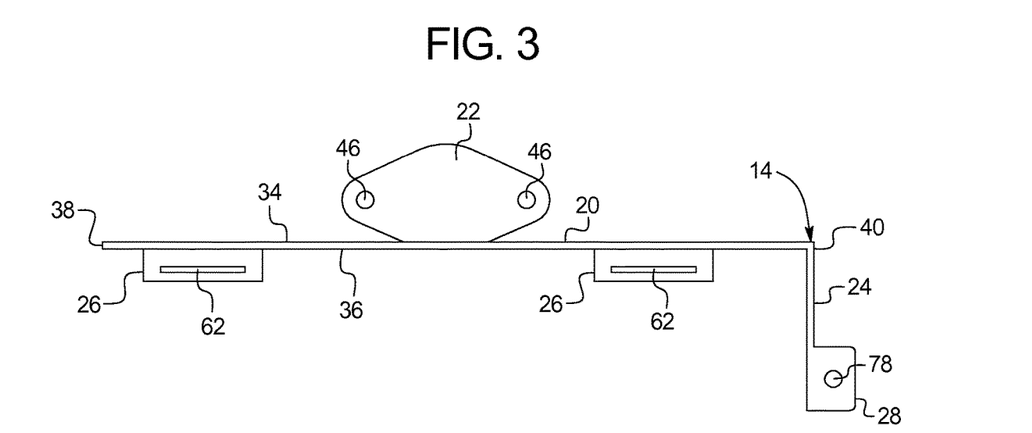
FIG. 3 is a front view of one embodiment of a member of the mounting device illustrated in FIG. 1.
Figure 4:
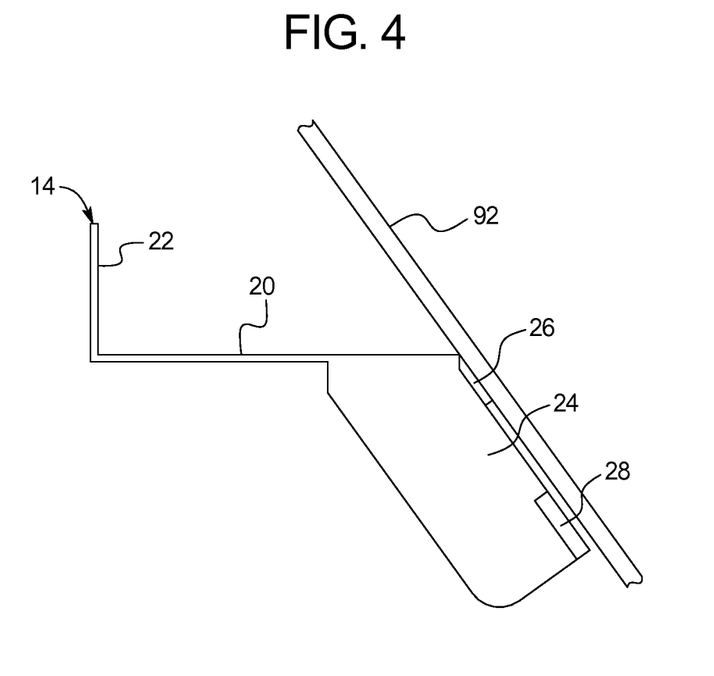
FIG. 4 is a side elevation view of one embodiment of a member of the mounting device illustrated in FIG. 1.

FIGS. 2 to 4 show first member 14 in more detail. First member 14 can be made of any suitable material, for example, steel, stainless steel, aluminum, carbon fiber, plastic, or fiberglass. The finish of first member 14 depends on the material being used.

In the illustrated embodiment, first member 14 includes a base plate 20, a mount 22, a stabilization arm 24 having a side tab 28, and two projections 26, each forming tab receiving slots 62. Base plate 20 has a front side 30, a back side 32, a top side 34, a bottom side 36, a left side 38 and a right side 40 (from the point of view of FIG. 1). Mount 22 projects upwardly from the front side 30, and while projections 26 project downwardly at an angle from back side 32 (from the point of view of FIG. 1). The angle is intended to correspond to the angle of a motorized vehicle windshield 92 (FIGS. 6 and 7). In the illustrated embodiment, there is a single stabilization arm 24 projecting towards windshield 92 from right side 40. Stabilization arm 24 can be located alternatively on either side of base plate 20, or multiple stabilization arms 24 can be located on both sides of base plate 20, projecting towards windshield 92.

The dimensions of first member 14 can vary. In one embodiment, base plate 20 is about 8.5 inches (21.6 cm) from left side 38 to right side 40, and about 2.375 inches (6.0 cm) from front side 30 to back side 32. Stabilization arm 24 projects about 2.5 inches (6.4 cm) from bottom side 36 and is about one inch (2.5 cm) wide. Mount 22 is about 2.375 inches (6.0 cm) wide and about one inch (2.5 cm) tall. In the illustrated embodiment, projections 26 and stabilization arm 24 are angled as they project downwardly from base plate 20 so as to approximately match the slope of motorized vehicle windshield 92. Those of ordinary skill in the art will understand that different dimensions and bend angles can and should be used with different types of motorized vehicles.

Mount 22 in FIGS. 1 to 4 projects outwardly from base plate 20 and includes a face plate that is configured to receive a motor vehicle accessory, or a mount therefore, and position the motor vehicle accessory (or its mount) for ready viewing by a motor vehicle driver. In the illustrated embodiment, mount 22 includes two apertures 46, which can be used for bolting a motor vehicle accessory or its mount to device 10. One of ordinary skill in that art will recognize that more or less than two apertures or other mounting mechanisms can be used alternatively to attach the motor vehicle accessory, for example, clamps, springs and the like. Mount 22 can be integrally formed with base plate 20 (FIG. 2), or can be a separate piece that is removably or permanently attached to base plate 20. As illustrated in FIGS. 6 and 7, in an embodiment mount 22 is configured to receive an accessory mount 100 (e.g. FIG. 8) for mounting the motorized vehicle accessory.

Figure 5:
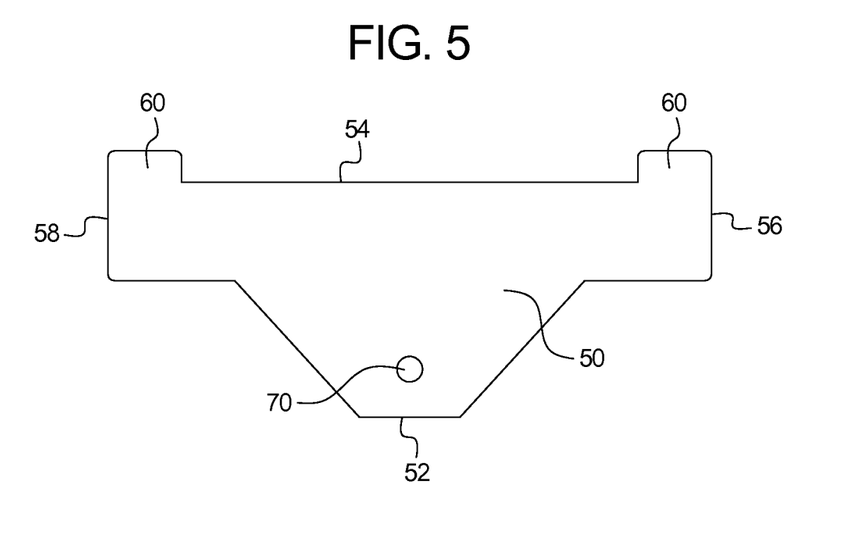
FIG. 5 is a top view of one embodiment of another member of the mounting device illustrated in FIG. 1.

FIG. 5 illustrates second member 16 in more detail. Second member 16 can be made of any suitable material, for example, steel, stainless steel, aluminum, carbon fiber, plastic, or fiberglass. The finish of second member 16 depends on the material being used.

Second member 16 includes a base plate 50 having (according to FIG. 1) a front side 52, a rear side 54, a right side 56 and a left side 58. In the illustrated embodiment, second member 16 is symmetric, so the top and bottom views of second member 16 look the same. Two tabs 60 project outwardly from rear side 54, near right side 56 and left side 58.

Like first member 14, the dimensions of second member 16 can vary. In one embodiment, base plate 50 is about six inches (15.2 cm) from right side 56 to left side 58, and about 2.375 inches (6.0 cm) from front side 52 to back side 54. Tabs 60 are about 0.75 inch (1.9 cm) wide and project out about 0.25 inch (0.6 cm) from back side 54. Those of ordinary skill in the art will understand that different dimensions can and should be used with different types of motor vehicles. Second member 16 is dimensioned to mate with first member 14.

First member 14 and second member 16 are configured to be positioned around a fixture of a motorized vehicle. In the illustrated embodiment, first member 14 and second member 16 are configured to be positioned around a top surface 96 of vent cover 90, located adjacent to a motorized vehicle windshield 92. Those of ordinary skill will understand, however, that mounting device 10 can be positioned instead around other motorized vehicle fixtures, and in particular any type of flat, plate-like surface.

Again, in use, first member 14 is placed on top of top surface 96 of a vehicle vent cover 90, with bottom side 36 of member 14 resting against the top surface 96, while second member 16 is placed beneath top surface 96. The tabs 60 of second member 16 fit into slots or apertures 62 of projections 26 of first member 14, so that second member 16 can be pivotally attached to first member 14, and hinge at the back side 32 of first member 14. In the illustrated embodiment, the two projections 26 are sized and angled to project through upper vent holes in top surface 96 of an existing vent for a Honda™ Goldwing™. Those of ordinary skill in the art will further understand that the projections 26 and/or the tabs 60 can be placed on either or both of first member 14 and second member 16.

Fastener securement mechanisms 66a and 66b are used to secure first member 14 to second member 16 at the front side 30 of first member 14. In the illustrated embodiment, the securement mechanism includes a nut 66b and a bolt 66a, such as a wingnut and screw, respectively, which pass through aperture 68 of first member 14 and aperture 70 of second member 16. Those of ordinary skill in the art will recognize that first member 14 can be secured to second member 16 at the front side 30 in other ways, for example, by clamps or other attachment means. As the nut and bolt are tightened, the front side 30 of first member 14 and the front side 52 of second member 16 are drawn together to clamp down onto top surface 96 of vent cover 90 of the motorized vehicle, fixing mounting device 10 removeably to the vehicle without having to drill any mounting holes in the vehicle.

As discussed above, stabilization arm 24 and screw 80 prevent mounting device 10 from vibrating when the motor vehicle is being driven. In the illustrated embodiment, stabilization arm 24, having tab 28, is formed integrally with base plate 20. Stabilization arm 24 can alternatively be formed as a separate piece that is removably or permanently attached to first member 14 or second member 16. In a preferred embodiment, side tab 28 is angled to at least substantially match the angle of windshield 92.

After first member 14 and second member 16 have been secured to vent cover 90 adjacent to windshield 92, stabilization arm 24 allows pressure to be applied against windshield 92 (or another part of the motor vehicle) and against mounting device 10 to stabilize the mounting device, preventing vibration during use. In the illustrated embodiment, screw 80 is part of a stabilization mechanism 76 used in conjunction with aperture 78 on side tab 28 of first member 14. Screw 80 is threaded through mating female threads in aperture 78 to apply pressure against windshield 92 and mounting device 10. A soft tip 82, such as a plastic or rubber tip, can be placed on the distal end of screw 80, so that the screw does not scratch windshield 92.

As screw 80 is screwed into aperture 78 and soft tip 82 presses against windshield 92 or another feature of the motorized vehicle, a force provided by windshield 92 tends to push mounting device 10 away from windshield 92 and slightly upwardly to push second member 16 against the bottom side of top surface 96 of vent cover 90. The force stabilizes mounting device 10, so that it does not come loose or vibrate as the motor vehicle is being driven. Stabilization mechanism 76 can also include a locking screw that jams against arm 24 to hold fastener 80 at a set position.

Although in the illustrated embodiment stabilization mechanism 76 includes a screw 80 and a soft tip 82, those of ordinary skill in the art will recognize that other stabilization mechanisms 66 can be used to press against windshield 92 or another vehicle fixture, so as to stabilize mounting device 10. For example, the stabilization mechanism could instead include a shim that fills the gap between stabilization arm 24 and windshield 92 or other vehicle fixture. Alternatively, screw 80 can be screwed into the windshield or other part to push or pull mounting device 10 away from or towards the windshield or other part.

FIGS. 6 and 7 illustrate mounting device 10 secured to a vent cover 90 and stabilized against a motor vehicle windshield 92. As illustrated, mounting device 10 can be secured against the vent cover 90 without obstructing the top surface 96 or vents 94 of vent cover 90. In the configuration illustrated, mounting device 10 places mount 22 in position to receive a motor vehicle accessory and position the motor vehicle accessory directly in front of the motor vehicle driver for easy access while driving. In one preferred embodiment, the motor vehicle accessory is a GPS device that the driver can use to navigate the motor vehicle. The GPS device can be bolted to mount 22 via apertures 46. As illustrated in FIG. 6, mount 22 positions the GPS device to be easily viewed by a motor vehicle driver, such that the motor vehicle driver simply needs to look slightly downwardly to view the GPS device.

One of ordinary skill in the art will understand that mount 22 can also be used for other types of motor vehicle accessories, for example a cup holder, a radar detector, a camera, a cell phone, a compass, a clock and/or a speedometer, for example. It has been determined that the mounting device 10 as illustrated herein works particularly well with the stock vent of a Honda™ Goldwing™ windshield. Other motorized vehicles suitable for mounting device 10 include other types of motorcycles, scooters, mopeds, snowmobiles and boats, etc., having a windshield.

A vent cover 90 is just one type of motorized vehicle fixture that can be used for attaching mounting device 10. Other features are envisioned. For example, mounting device 10 can be attached instead to a plate bolted to windshield 92. Mounting device 10 can be attached to such a plate in the same manner described above with respect to the upper surface 96 of vent cover 90 or be bolted to the plate, which is in turn bolted to windshield 92.

In a further alternative embodiment, one or more pair of powerful magnets is used to firmly but releasably attach a mounting device 10 to the windshield 92 of a motorized vehicle. An accessory mount 100 illustrated below could slidingly attach or be bolted to the windshield mounting device, which can be moved to a desired location via the releasably securable magnet pair.

Figure 8:
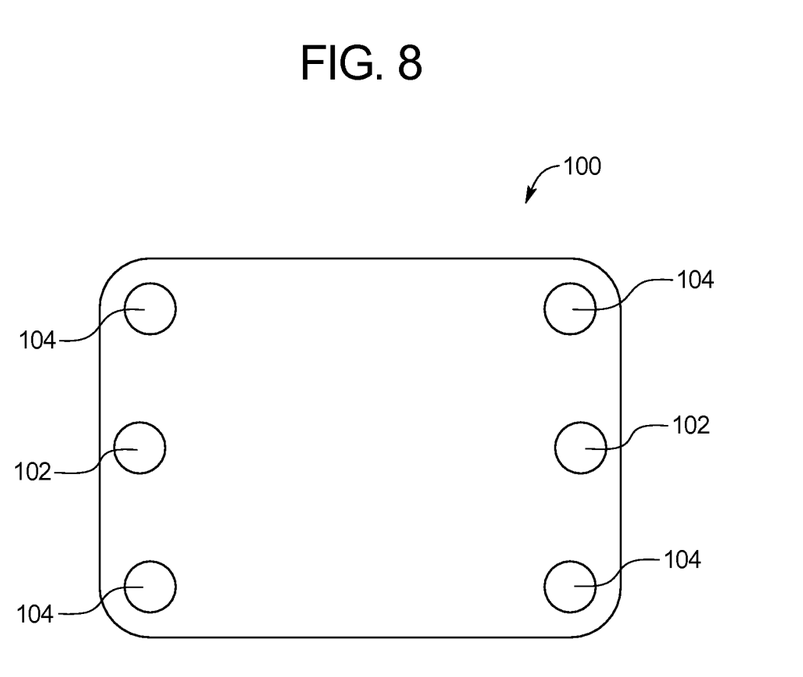
FIG. 8 is a front view of one embodiment of an accessory mount.

FIG. 8 shows an example of an accessory mount 100 that is configured to be mounted to mount 22 of mounting device 10. Accessory mount 100 includes apertures that align with the apertures 46 of mount 22 so that accessory mount 100 can be mounted to mount 22. Accessory mount 100 also has additional apertures 104 for receiving and/or mounting a motor vehicle accessory.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

I claim:

1. A mounting device combinable with a motorized vehicle comprising:
   a first member positionable against a first surface of a vent cover of the vehicle, the first member including a back end with at least one projection including a slot;
   a second member positionable against a second surface of the vehicle vent cover, the second member including a back end with at least one tab configured to fit into the slot of the at least one projection, wherein placement of the at least one tab into the slot enables slight movement of the second member relative to first member so that the vehicle vent cover can be clamped between the first member and the second member when the first member and the second member are fastened at a front end of the second member;

a mount positioned on one of the first or second members for receiving a motorized vehicle accessory; and at least one stabilizing screw configured to screw through at least one of the first and second members to push at least one of the first and second members away from a windshield of the vehicle.

2. The mounting device of claim 1, wherein the second member is removably attachable to the first member.

3. The mounting device of claim 1, wherein placement of the at least one tab within the slot pivotally attaches the first and second members together.

4. The mounting device of claim 1, wherein the at least one stabilizing screw is configured to apply pressure against at least one of the first and second members for stabilization while the motorized vehicle is being driven.

5. The mounting device of claim 1, wherein the at least one stabilizing screw is threadingly connected to one of the first or second members.

6. The mounting device of claim 1, wherein attachment of the first and second members around the vehicle vent cover places the mounting device adjacent to the motorized vehicle's windshield.

7. The mounting device of claim 1, wherein the mount is bent from a clamping portion of one of the first or second members.

8. The mounting device of claim 1, wherein the mount is configured to receive an accessory mount, the accessory mount for mounting the motorized vehicle accessory.

9. A method of mounting a motor vehicle accessory to a motorized vehicle vent cover comprising:

securing a mounting device to the vehicle vent cover, the mounting device including (i) a first member positionable against a first surface of the vehicle vent cover, the first member including a back end with at least one projection including a slot, (ii) a second member positionable against a second surface of the vehicle vent cover, the second member including a back end with at least one tab configured to fit into the slot of the at least one projection, wherein placement of the at least one tab into the slot enables slight movement of the second member relative to first member so that the vehicle vent cover can be clamped between the first member and the second member when the first member and the second member are fastened at a front end of the second member, (iii) a mount positioned on one of the first or second members for receiving a motorized vehicle accessory, and (iv) at least one stabilizing screw configured to screw through at least one of the first and second members to push at least one of the first and second members away from a windshield of the vehicle; and applying pressure between the mounting device and the windshield by turning the at least one stabilizing screw.

10. The method of claim 9, wherein applying pressure between the mounting device and the windshield includes turning the at least one stabilizing screw towards the windshield.

11. The method of claim 9, wherein securing the mounting device includes clamping the mounting device to the vehicle vent cover.

12. The method of claim 9, which includes enabling an accessory mount to be secured to the mount of the mounting device so that the accessory can be mounted to the accessory device.

* * * * *